United States Patent

Tompkins et al.

[11] Patent Number: 5,550,753
[45] Date of Patent: Aug. 27, 1996

[54] MICROCOMPUTER SPA CONTROL SYSTEM

[75] Inventors: Michael E. Tompkins, Missouri City; Michael J. Green, Houston, both of Tex.

[73] Assignee: Irving C. Siegel, Houston, Tex.

[21] Appl. No.: 385,062

[22] Filed: Feb. 7, 1995

Related U.S. Application Data

[63] Continuation of Ser. No. 162,420, Dec. 3, 1993, abandoned, which is a continuation of Ser. No. 54,581, May 27, 1987, abandoned.

[51] Int. Cl.$^6$ .................................................. G06F 17/00
[52] U.S. Cl. ...................... 364/505; 364/557; 236/12.12; 4/541.1

[56] References Cited

U.S. PATENT DOCUMENTS

| | | | |
|---|---|---|---|
| 4,204,204 | 5/1980 | Pitstick | 340/712 |
| 4,215,398 | 7/1980 | Burkett et al. | 364/101 |
| 4,322,297 | 3/1982 | Bajka | 210/742 |
| 4,368,549 | 1/1983 | Ramey | 4/493 |
| 4,381,031 | 4/1983 | Whitaker et al. | 165/39 |
| 4,385,724 | 5/1983 | Ramsauer et al. | 236/25 A |
| 4,398,789 | 8/1983 | Pryor | 350/96.10 |
| 4,404,697 | 9/1983 | Hatcher | 4/492 |
| 4,406,550 | 9/1983 | Gray | 374/110 |
| 4,409,694 | 10/1983 | Barrett, Sr. et al. | 4/545 |
| 4,410,791 | 10/1983 | Eastep | 219/307 |
| 4,421,270 | 12/1983 | Raleigh et al. | 236/20 R |
| 4,527,246 | 7/1985 | Masson | 364/505 |
| 4,563,780 | 1/1986 | Pollack | 4/192 |
| 4,564,962 | 1/1986 | Castleberry et al. | 4/543 |
| 4,621,613 | 11/1986 | Krumhansl | 126/416 |
| 4,682,728 | 7/1987 | Oudenhoven et al. | 236/12 |
| 4,693,415 | 9/1987 | Sturm | 236/12.12 |
| 4,696,428 | 9/1987 | Shakalis | 236/12.12 |
| 4,711,392 | 12/1987 | Kidouchi et al. | 236/12.12 |
| 4,713,525 | 12/1987 | Eastep | 219/308 |
| 4,757,943 | 7/1988 | Sperling et al. | 236/12.12 |
| 4,768,705 | 9/1988 | Tsutsui et al. | 236/12.12 |
| 4,780,917 | 11/1988 | Hancock | 4/544 |
| 5,361,215 | 11/1994 | Tompkins et al. | 364/505 |

FOREIGN PATENT DOCUMENTS

| | | |
|---|---|---|
| 0009249 | 4/1980 | European Pat. Off. . |
| 256287 | 10/1985 | France . |
| 60-14677 | 1/1985 | Japan . |

OTHER PUBLICATIONS

"Hydrotouch II, Digital Command Center" by BakerHydro, Inc., a division of TOLO, Incorporated, 1981.
"Spa-Troller, The Computerized System" by the Spa-Trol Company (no date).
Spa Troller Newsletter, Issue No. 1; Oct. 12, 1981; (2 pp.).
Spa Troller Newsletter, Issue No. 3; Dec. 18, 1981; (2 pp.).
Spa Troller Newsletter, Issue No. 4; Mar. 1982; (2 pp.).
Spa Troller Newsletter, Issue No. 5; Jun. 1, 1982; (2 pp.).
Spa Troller Newsletter, Issue No. 5; Sep. 1982; (1 pp.).
Photographs (2 pp.) (no date).
Graphic of a Spa-Trol; (1 pp.) (no date).
Sentry 700 Series—"701" and 724 Installation and Owners Manual copyrighted 1988 and revised Jun. 1990.
Balboa 700 Series Schematic dated Oct. 19, 1988 and revised Dec. , 1988. Deposition of Glenn Gouldey, vol. 1, Mar. 11, 1996; (p. 1–75) (no date).

(List continued on next page.)

*Primary Examiner*—Ellis B. Ramirez
*Attorney, Agent, or Firm*—Chamberlin, Hrdlicka, White, Williams & Martin

[57] ABSTRACT

An improved spa control system is disclosed. The improvements may be made individually or in conjunction with any combination of all of the other improvements of the present invention. The invention describes a spa control system which calculates the rate of heating of the heater of the water in the spa to control the operation of the heating element. The system uses a interconnection panel to link a control panel to the power supply and to the operative components of the system. The unique connection of the control panel to the interconnection panel permits the control panel to be located adjacent to the spa.

13 Claims, 4 Drawing Sheets

OTHER PUBLICATIONS

Deposition of Glenn Gouldey, vol. 1, Mar. 11, 1996; (pp. 1–75) (no date).

Eaton Spa Monitor II descriptions dated Jan. 1, 1983 and May 24, 1983 (p. 2).

Block Diagram Spa Monitor; undated (p. 1) (no date).

Sales Call Report dated Jul. 20, 1987, Aug. 16, 1983, Sep. 26, 1983 (p. 3).

MICROCOMPUTER SPA CONTROL SYSTEM

This is a continuation of application Ser. No. 08/162,420 filed on Dec. 3, 1993 now abandoned, which is a continuation of application Ser. No. 054,581, filed May 27, 1987 now abandoned.

BACKGROUND

The design of systems to control spas is complicated by the environment of the spa itself. Typically, spa controls contain heating elements, controls, switches, and wiring harnesses which deteriorate when exposed to moisture or extreme levels of humidity. Since the heated water of the spa raises the humidity level, the atmosphere surrounding the controls of the spa unit is inherently corrosive to spa control systems.

The accuracy of the temperature of the spa water is essential to the safety and comfort of the spa user. This temperature is difficult to accurately control, since the temperature of the water can vary rapidly depending on the number of spa users, the ambient temperature of the air, and other environmental factors. To conserve energy, the spa temperature is customarily raised to the desired level shortly before the expected use of the spa, and is not maintained at a constant temperature. Depending on the level of use of the spa the temperature of the spa water may be cycled several times per day. During these cycles, the control of the water temperature is difficult to maintain without overheating or underheating the water. Typically, a spa control system merely heats the water with a heating element until the temperature of the water and that temperature matches a predetermined setting selected by the spa user. Since the heating element is not turned off until that desired water temperature is reached, the residual heat in the heating element may increase the temperature of the water beyond the actual temperature desired. Conversely, the location of the temperature sensor may be located in the spa in such a fashion that it does not sense the actual, median water temperature and therefore, the heating element is turned off before the temperature of the water reaches the desired level.

Present spa controllers operate on line voltages which should not be accessible to the spa users. To meet safety specifications, these controls are typically located at a distance from the spa itself.

SUMMARY OF THE INVENTION

The present invention overcomes the foregoing difficulties by providing a spa control system which accurately and efficiently controls the operation of the spa and is not adversely affected by the corrosive environment surrounding the spa. The system monitors the temperature of the heating element and the water, and this data is processed by a microcomputer to control the temperature of the water in the spa.

DESCRIPTION OF THE PREFERRED EMBODIMENTS

Figure 1:
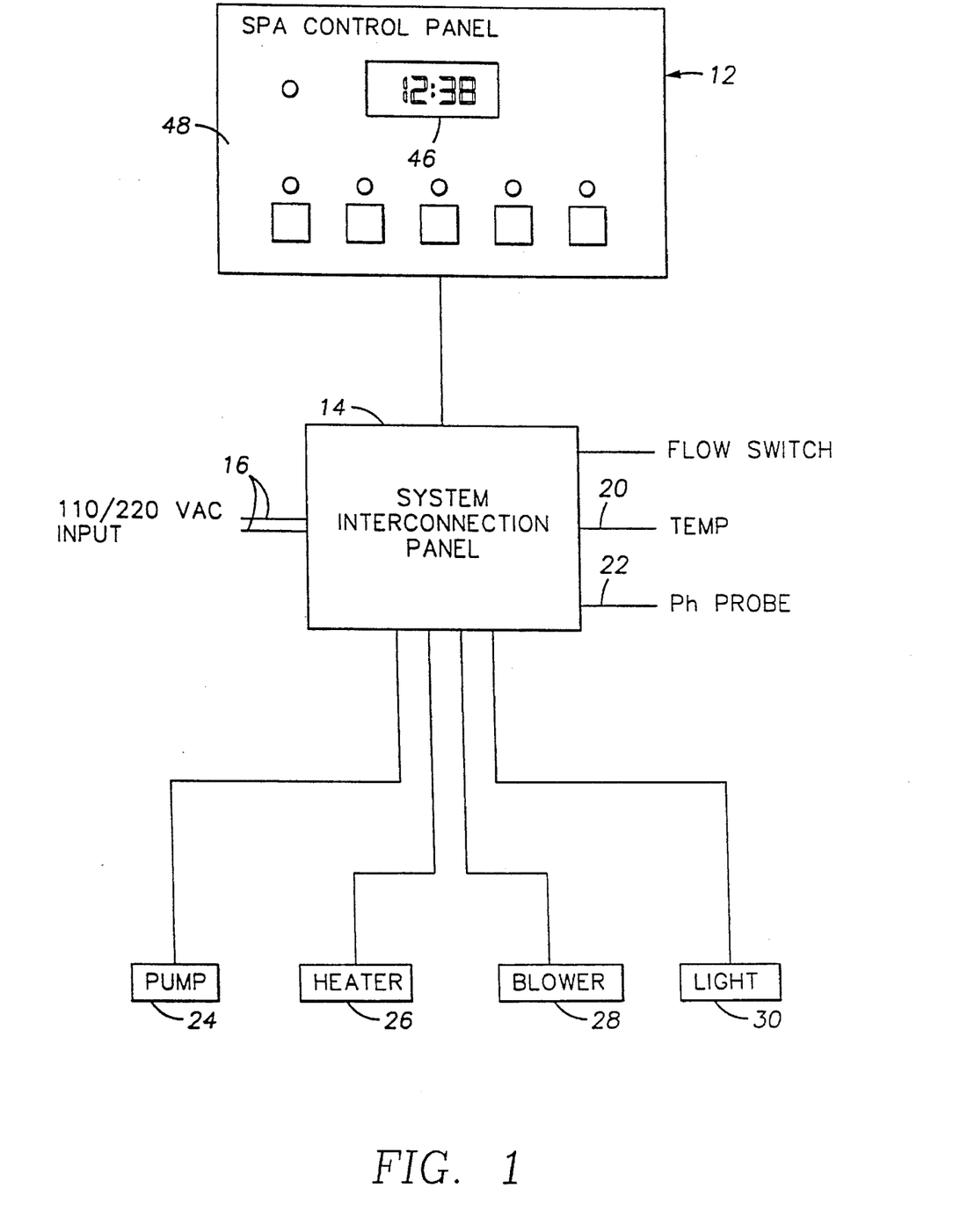
FIG. 1 illustrates a schematic block drawing of the spa control system.

FIG. 1 illustrates a block diagram of the overall spa control system. The spa control system uses an intelligent microcomputer to monitor and control the operation of the spa. The system uses solid state electronic components which eliminate many of the problems associated with traditional mechanical timer and relay control systems. The use of solid state electronic components increases the reliability of the system and reduces the maintenance necessary to maintain the spa in operable condition.

Figure 2:
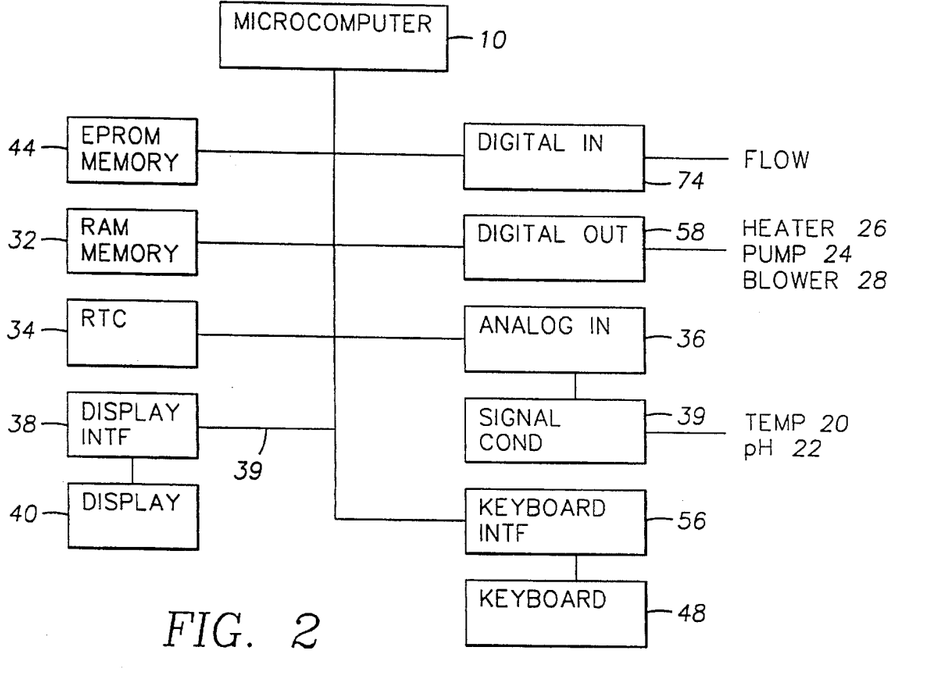
FIG. 2 illustrates a block diagram of the microcomputer and its associated components.

Referring to FIG. 1, the system generally comprises a spa control panel which is connected to a system interconnection panel. The system interconnection panel is also connected to power input, to various sensors which detect parameters such as flow rate, temperature, and ph of the water, and also the mechanical and electrical components of the spa, such as the pump, heater, blower, and lights. The system monitors the temperature of the heating element and the water utilizing a solid state sensor for detecting the temperature of the water and another solid state sensor for detecting the temperature of the heating element; and FIG. 2 illustrates a block diagram of the spa control panel and its associated components. The electronics in the spa control panel are designed to handle temperature extremes of minus twenty to plus seventy degrees centigrade. The technology used in this design is Complimentary Metal Oxide Semiconductors (CMOS) which are low in power consumption and high in reliability. The microcomputer is an 8-bit control device with an 8-bit data bus. Its function is to execute instructions, control processes, make logical decisions and compute values. The microcomputer operates at a clock speed of two megahertz and can make thousands of calculations per second. The microcomputer reads instructions from the EPROM memory and then executes the appropriate actions.

The Electrical Programmable Read Only Memory (EPROM) stores the instructions for the microcomputer to execute. Once a program is created on the development system, the final software is loaded into the EPROM. The EPROM can be modified to add new features, or additional EPROMs can be connected to manage different functions and applications. The Random Access Memory (RAM) is a memory device which stores temporary information while the information is being processed by the microcomputer. The RAM only reads and writes data, and can hold data for future reference with backup battery power even after the main power is turned off. The RAM stores data such as the number of hours on the heater, the number of times that the temperature of the spa exceeds the pre-selected temperature, and other information.

The Real Time Clock (RTC) calculates the proper time of day. The microcomputer uses this information to schedule events concerning the operation of the spa, such as when the spa is turned on, when the water is circulated, and other events. The RTC is backed with battery power so that it maintains the accurate time when the main power supply is turned off.

The display is a vacuum-fluorescent type which has a blue-green color. The display contains four seven-segment characters, colon and a.m. and p.m. indicators. The Display Interface represents circuitry which drives and updates the display device. Information from the microcomputer is decoded and displayed on the screen. The data remains on the screen until the microcomputer sends a new message or the system is reset or powered off.

The keyboard shown is a flat panel membrane style which is incorporated into the front panel. One type of keyboard has nine push dash buttons and nine translucent cut-offs for backlighting of Light Emitting Diodes (LEDS). The keyboard is mounted on an aluminum backpanel to provide a firm surface when depressing the buttons. The keyboard interface provides circuitry which transmits information from the keyboard to the microcomputer. The keyboard interface conditions the signals and only permits the activation of one key at a time. The microcomputer is signaled when a key is depressed and then reads the key data.

The Digital Inputs monitors digital data from external devices, such as the flow switch. Each field digital input is optically isolated and surge protected to prevent external signals from entering the main components of the microcomputer. The Digital Outputs drives the external output devices, such as the blower, heater, pump and other auxiliary devices. The low voltage signals are optically isolated and then drive a TRIAC device which provides the high voltage and high current required by the external devices. The Analog Input converts information from various sensors into digital information so that the data can be read by the microcomputer. The converter translates the analog information into digital information through dual slope integration which permits fast and accurate conversion. The signals from external probes and sensors are conditioned by amplifying the signals so that the A-D converter can make an accurate conversion. The Signal Conditioning section provides transient and surge protection to reduce static and noise.

Figure 3:
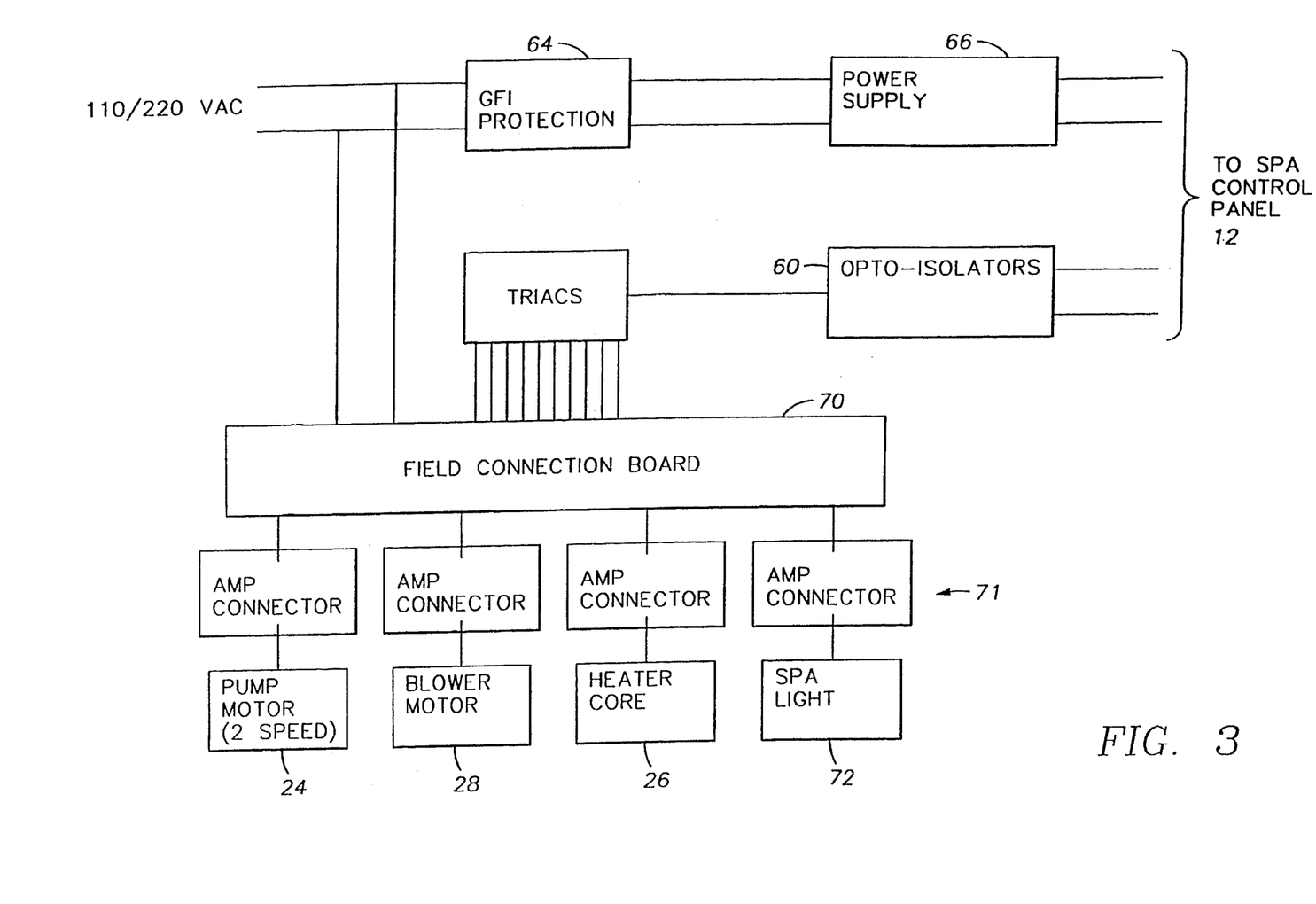
FIG. 3 illustrates a block diagram of the spa control system interconnection panel.

As previously set forth, the system interconnection panel connects the components of the spa control system. Referring to FIG. 3, the power to the system interconnection panel is supplied through a conventional power supply. The Ground Fault Interrupter (GFI) provides protection to the system interconnection panel if excessive current flows through the ground leg of the input. The GFI prevents excessive voltage from entering the system after the device has been triggered. After the power has passed through the GFI, the Power Supply converts the 110 or 220 Volt AC into the low voltage and low power required by the controller. The power supply also contains the backup battery used to provide power to the RTC and RAM when the main power is turned off.

The Opto-Isolators receive signals form the spa control panel which designate the operation of the proper output device. The Opto-Isolators isolate the low voltage and current control system from the high voltage and high current of the main power supply. Connected to the opto-isolators are triacs, which are solid state devices used to drive high voltage and high current and high output devices. Triacs function like relays except that triacs are electronic devices that do not contain any moving parts. Typically, the triac to a heating element may be rated at forty amps maximum current and the triacs to other output devices might typically be rated at twenty-five amps. Connected to the triacs is a field connection board which mechanically permits the connection and disconnection of field devices such as a pump motor, blower motor, heater core, or spa light.

Figure 4:
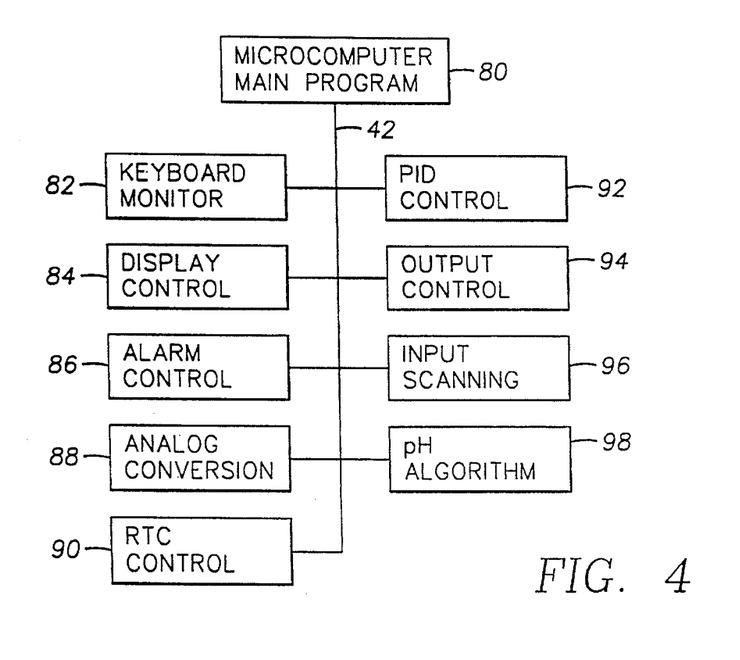
FIG. 4 illustrates a functional block diagram of the software which controls the spa control system.

FIG. 4 illustrates a functional block diagram of the software which runs the microcomputer. The final software code is inscripted on the EPROM for operating the microcomputer. The main program schedules the operation of all other subprograms and performs general housekeeping chores, such as memory management, timer control, interrupt handling and the scheduling of tasks.

The keyboard monitor routine scans the keyboard and is triggered by the operation of a key. The key signal is then decoded and the main program is triggered to initiate a series of programmed events. The program ignores multiple key depressions and erroneous entries and operates only upon the signal generated from a proper key entry. The display control program converts data from the memory to readable messages which can be shown on the display. The display control handles the timing of the signals so that the display performs in an efficient and proper manner. The alarm control monitors the proper operation of the entire system. If the system malfunctions or otherwise operates incorrectly, the alarm will signal the malfunction. Examples of malfunctions in the system that might occur are the malfunction of the heater, and whether the pH levels are within an acceptable range. In the event of a malfunction, a signal will be sent to the display controller to alert the user of the malfunction.

The Analog Conversion Program manipulates the converter circuitry to convert sensor input signals to digital information. This program also converts the digital information to engineering units for the purposes of display and comparison. The RTC control program controls all interaction with the Real Time Clock. The program is responsible for loading data for future events. The PID Control stands for purportional, integral and derivative. This program performs the closed loop control on the heating elements. The program monitors the temperature of the water and determines when the heater should be engaged. The program issues a command which activates the heater and then monitors the temperature to determine when the heater should be turned off. The program is unique in that it monitors the rate decrease and the rate of increase of the water temperature so that the final temperature of the water is not higher or lower than the selected temperature. The spa control system can achieve an accuracy of plus or minus one degree fahrenheit with the heating and monitoring elements.

The output control program issues commands to the output components to turn on the TRIACS for control of the pump, heater, blower, lights and other components. The input scanning program monitors devices such as push buttons and switches. The flow switch would be monitored by this program, as well as any other shut down or feed back signals. The pH algorithm converts raw digital data received from the A-D converter on the pH channel and converts this data to standard pH units of measure.

Figure 5:
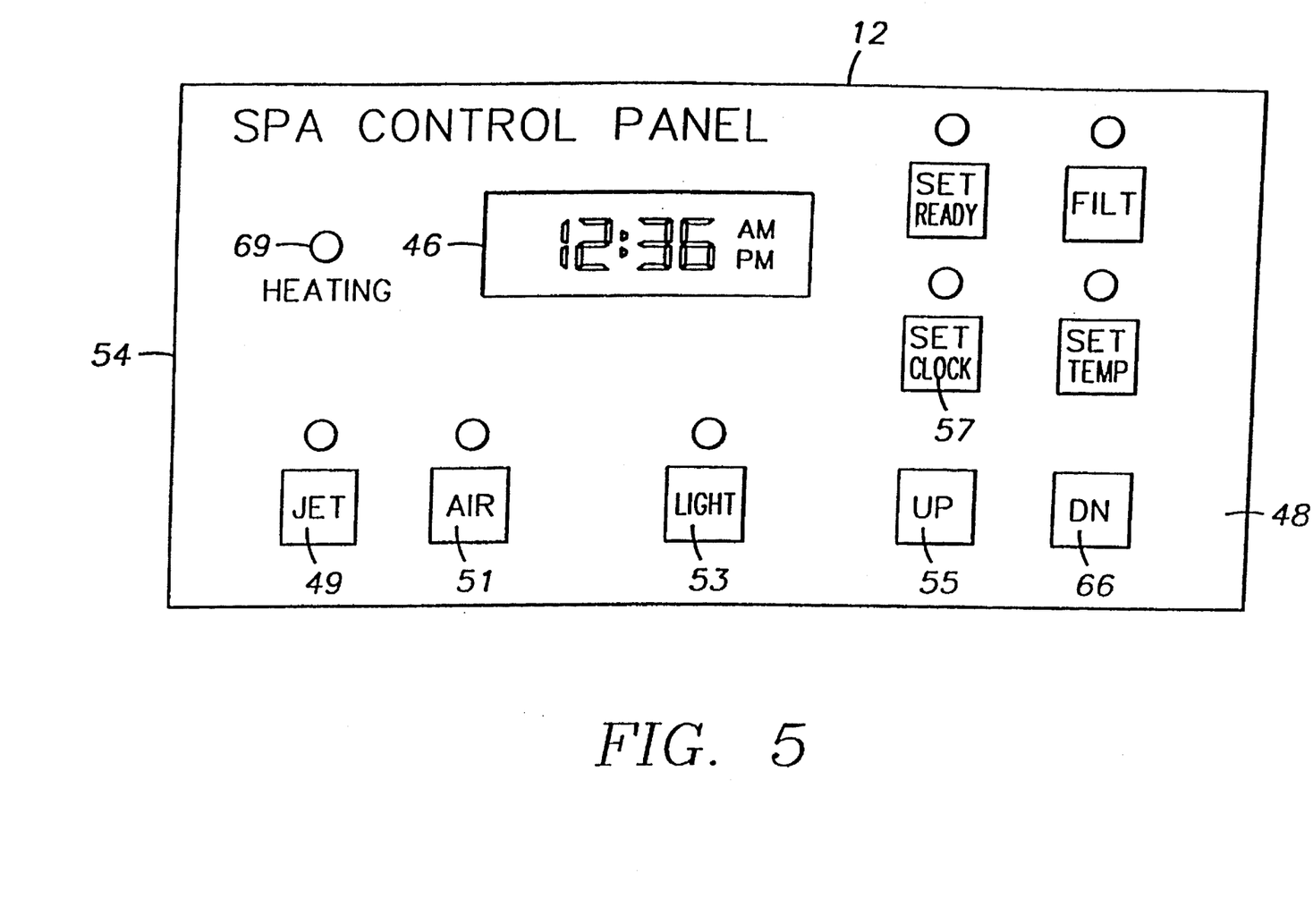
FIG. 5 illustrates one embodiment of a display.

FIG. 5 shows one possible configuration of the keyboard for the spa control panel. The overlay on the spa control panel contains lights and a series of push button switches which can be depressed to switch on the appropriate functions. Preferably, an audible tone alerts the user that the computer has received the signal sent by depressing the key. The jet button operates the high speed pump for the jet action in the spa. After the jet button is depressed, the system will shut off the pump if there is no flow in the system after three seconds of operation. The user is notified of the malfunction by an error message shown on the display. In a preferred embodiment, the low speed pump automatically is operated when the heater is activated. By pressing the jet button, the high speed overrides the low pump. The heater is still operable but the heating efficiency decreases because the water is moving faster over the heating element.

The turbo button operates the blower motor for the bubbling action in the spa. The light button operates any lights installed in the spa. The up arrow button is used in conjunction with the set time, set temperature, set ready and filter buttons. The purpose of the up arrow button is to increment data that is presented on the display. The down arrow button is used in conjunction with these same buttons to decrement data that is presented on the display. The clock button is used to set the current time of day and is activated by pushing the button. The desired time can then be set by activating the up arrow button or the down arrow button. The set temperature button can be used to control the temperature value for the thermostat in the controller. To set the temperature, the set temperature button is depressed and the current setting for the thermostat will be shown on the display. The up arrow button or the down arrow button can be used to increase or decrease the temperature setting as desired. When the desired value is shown on the display, the set temperature button is depressed and the system will revert to the normal scroll in display. The ranges on the temperature setting may range from 40 to 104 degrees fahrenheit.

The system programmer button is used to preset the time and temperature that is desired by the user. The controller calculates the proper time to initiate heating based on the present temperature of the water, and the stored data on the rate of heating for the particular spa. Each time that the spa is heated, the controller monitors the rate of change in the water temperature and stores this information in the internal memory. This data is then used to calculate the heating time.

To operate the set ready mode, the set ready button is depressed and the set ready light and the hours light digits are eliminated. The hours are set by using the up button and down button arrow. When the hours are correct, the set ready button is depressed and the minutes digits will flash. The minutes data are set by using the up button and down button arrow. When the minutes data is correct, the set ready button is depressed and the current thermostat setting is displayed. The up button or down button arrow is pressed to select the proper temperature. The set ready button is then depressed again and "on" or "off" will flash on the display screen. This indicates that the feature is enabled. The set ready button is again depressed and the system is activated. When it is time to begin the heating cycle, the system program LED flashing to indicate that the feature is active.

When the spa is heated to the proper temperature, the programmed thermostat setting becomes the current thermostat setting and the system will continue normal operation.

If enough time is not allocated for the spa to reach the desired temperature, and time runs out before the heating process is normally completed, the programmed thermostat setting will become the current thermostat setting and the system will continue normal operation.

The filtering button allows the user to select the time for circulating the water in the spa for normal maintainance. To operate, the filter button is depressed and the hours digits and the filter light will be eliminated. The up button and down button hours are operated to select the hour, and the filter button is depressed to set the new running time. The data is loaded into memory, the filter light will turn off and the display will return to the normal scroll in operation. When the filter functions active, the LED will flash.

The heating light is illuminated when the heating element is being activated. If the heating element is activated and the temperature of the water is not increasing, then an arrow message will be displayed. The LED will flash when the heater is in the warm-up or a cool-down cycle.

The system may be diagnosed by operating a switch in the system interconnection panel to place the keyboard in display in the diagnostics mode. By pressing the jet button, the total number of hours of operation on the pump will be displayed. Pressing the arrow button will show the total hours of operation on the blower motor. Pressing the set temp button will display the total hours of operation on the heater and will eliminate the set temp light. Pressing the time button will display the total hours the system was in an over temp state, designated as greater than 104 degrees fahrenheit in the preferred embodiment pressing any other button will eliminate the light associated with that button. Pressing the up arrow button or the down arrow button will eliminate all lights on the panel and will turn on all segments of the display along with the colon and the a.m. and p.m. indicators. The normal operation of the system is disabled when the maintenance switch is on.

The system may display error codes which show potential problems within the system. Typical error codes which may be displayed might include information showing that the heater was not heating, the pump was not operating, there was insufficient time to heat the spa to the desired temperature, there was no water flow in the system, or there was a failure in the computer.

The embodiments shown above are merely illustrative of the present invention. Many other examples of the embodiments set forth above and other modifications to the spa control system may be made without departing from the scope of this invention. It is understood that the details shown herein are to be interpreted as illustrative and not in a limiting sense.

What is claimed is:

1. A spa control system comprising a control panel, output components, and a heating element which heats the water in the spa, and further comprising:

a solid state sensor for detecting the temperature of water in the spa;

a solid state sensor for detecting the temperature of the heating element; and a microcomputer for processing the signals from said sensors to calculate the temperature of the water and the heating element so that the heating element controls the temperature of the water within a prescribed range.

2. A system as described in claim 1, further comprising a TRIAC which drives at least one output component of the spa control system.

3. A system as described in claim 1, further comprising an Opto-Isolator connected between the control panel and the Triacs for electrically isolating the control system from the main power supply.

4. A spa control system for detecting the malfunction of components within the system, comprising:

a display;

a pump;

a heating element;

a system interconnection panel which is connected to said pump and said heater; and a microcomputer for detecting the malfunction of said pump or said heating element and for generating a signal which illuminates said display to show the malfunction of the component.

5. A spa control system for controlling the temperature of water in the spa, comprising:

a heating element for heating the water;

a solid state sensor for detecting the temperature of the water;

a solid state sensor for detecting the temperature of said heating element;

a microcomputer for processing signals generated by said sensors to compute the temperature of the water and of said heating element, wherein said microcomputer activates and deactivates said heating element to control the temperature of said water within a selected range.

6. A spa control system as described in claim 5, wherein said microcomputer activates said heating element to heat the water to a selected temperature without heating the water above the selected temperature.

7. A spa control system as described in claim 5, wherein said microcomputer calculates the rate of heating of the water and said heating element, and activates and deactivates said heating element to heat the water to a selected temperature.

8. A spa control system for controlling the temperature of water in a spa, comprising:

a system interconnection panel containing a microcomputer and being connected to a power supply;

a control panel connected to said system interconnection panel;

a heating element connected to said system interconnection panel; and a pump for circulating water over said heating element.

9. A spa control system as described in claim 8, further comprising a heat sink adjacent said water for transferring heat from said system interconnection panel to said water.

10. A spa control system as described in claim 8, further comprising a display in said control panel for showing certain characters calculated by said microcomputer.

11. A spa control system as described in claim 10, wherein said display shows a character sent by said microcomputer which identifies a malfunction of said spa control system.

12. A spa control system as described in claim 10, wherein said display indicates the operation time of selected components of the spa control system.

13. A system as described in claim 4, wherein said microcomputer is positioned in said interconnection panel.

* * * * *

UNITED STATES PATENT AND TRADEMARK OFFICE
CERTIFICATE OF CORRECTION

PATENT NO. : 5,550,753
DATED : August 27, 1996
INVENTOR(S) : Michael E. Tompkins, et al It is certified that error appears in the above-indentified patent and that said Letters Patent is hereby corrected as shown below:

The title page, showing an illustrative figure, should be deleted and substitute therefor the attached title page.

Delete drawing Figs. 1-5, and substitute therefor drawing Figs. 1-5, as shown on the attached pages.

Signed and Sealed this

Twenty-second Day of July, 1997

Attest:

BRUCE LEHMAN

*Attesting Officer*   *Commissioner of Patents and Trademarks*

United States Patent [19]

Tompkins et al.

[11] Patent Number: 5,550,753
[45] Date of Patent: Aug. 27, 1996

[54] MICROCOMPUTER SPA CONTROL SYSTEM

[75] Inventors: Michael E. Tompkins, Missouri City; Michael J. Green, Houston, both of Tex.

[73] Assignee: Irving C. Siegel, Houston, Tex.

[21] Appl. No.: 385,062

[22] Filed: Feb. 7, 1995

Related U.S. Application Data

[63] Continuation of Ser. No. 162,420, Dec. 3, 1993, abandoned, which is a continuation of Ser. No. 54,581, May 27, 1987, abandoned.

[51] Int. Cl.$^6$ .................................................. G06F 17/00
[52] U.S. Cl. ...................... 364/505; 364/557; 236/12.12; 4/541.1

[56] References Cited

U.S. PATENT DOCUMENTS

| | | | |
|---|---|---|---|
| 4,204,204 | 5/1980 | Pistick | 340/712 |
| 4,215,398 | 7/1980 | Burkett et al. | 364/101 |
| 4,322,297 | 3/1982 | Bajka | 210/742 |
| 4,368,549 | 1/1983 | Ramey | 4/493 |
| 4,381,031 | 4/1983 | Whitaker et al. | 165/39 |
| 4,385,724 | 5/1983 | Ramsauer et al. | 236/25 A |
| 4,398,789 | 8/1983 | Pryor | 350/96.10 |
| 4,404,697 | 9/1983 | Hatcher | 4/492 |
| 4,406,550 | 9/1983 | Gray | 374/110 |
| 4,409,694 | 10/1983 | Barrett, Sr. et al. | 4/545 |
| 4,410,791 | 10/1983 | Eastep | 219/307 |
| 4,421,270 | 12/1983 | Raleigh et al. | 236/20 R |
| 4,527,246 | 7/1985 | Masson | 364/505 |
| 4,563,780 | 1/1986 | Pollack | 4/192 |
| 4,564,962 | 1/1986 | Castleberry et al. | 4/543 |
| 4,621,613 | 11/1986 | Krumhansl | 126/416 |
| 4,682,728 | 7/1987 | Oudenhoven et al. | 236/12 |
| 4,693,415 | 9/1987 | Sturm | 236/12.12 |
| 4,696,428 | 9/1987 | Shakalis | 236/12.12 |
| 4,711,392 | 12/1987 | Kidouchi et al. | 236/12.12 |
| 4,713,525 | 12/1987 | Eastep | 219/308 |
| 4,757,943 | 7/1988 | Sperling et al. | 236/12.12 |
| 4,768,705 | 9/1988 | Tsutsui et al. | 236/12.12 |
| 4,780,917 | 11/1988 | Hancock | 4/544 |
| 5,361,215 | 11/1994 | Tompkins et al. | 364/505 |

FOREIGN PATENT DOCUMENTS

| | | |
|---|---|---|
| 0009249 | 4/1980 | European Pat. Off. . |
| 256287 | 10/1985 | France . |
| 60-14677 | 1/1985 | Japan . |

OTHER PUBLICATIONS

"Hydrotouch II, Digital Command Center" by BakerHydro, Inc., a division of TOLO, Incorporated, 1981.
"Spa-Troller, The Computerized System" by the Spa-Trol Company (no date).
Spa Troller Newsletter, Issue No. 1; Oct. 12, 1981; (2 pp.).
Spa Troller Newsletter, Issue No. 3; Dec. 18, 1981; (2 pp.).
Spa Troller Newsletter, Issue No. 4; Mar. 1982; (2 pp.).
Spa Troller Newsletter, Issue No. 5; Jun. 1, 1982; (2 pp.).
Spa Troller Newsletter, Issue No. 5; Sep. 1982; (1 pp.).
Photographs (2 pp.) (no date).
Graphic of a Spa-Trol; (1 pp.) (no date).
Sentry 700 Series—"701" and 724 Installation and Owners Manual copyrighted 1988 and revised Jun. 1990.
Balboa 700 Series Schematic dated Oct. 19, 1988 and revised Dec., 1988. Deposition of Glenn Gouldey, vol. 1, Mar. 11, 1996; (p. 1–75) (no date).

(List continued on next page.)

*Primary Examiner*—Ellis B. Ramirez
*Attorney, Agent, or Firm*—Chamberlin, Hrdlicka, White, Williams & Martin

[57] ABSTRACT

An improved spa control system is disclosed. The improvements may be made individually or in conjunction with any combination of all of the other improvements of the present invention. The invention describes a spa control system which calculates the rate of heating of the heater of the water in the spa to control the operation of the heating element. The system uses a interconnection panel to link a control panel to the power supply and to the operative components of the system. The unique connection of the control panel to the interconnection panel permits the control panel to be located adjacent to the spa.

13 Claims, 4 Drawing Sheets

(12) EX PARTE REEXAMINATION CERTIFICATE (9612th)

United States Patent
Tompkins et al.

(10) Number: US 5,550,753 C1
(45) Certificate Issued: Apr. 29, 2013

(54) MICROCOMPUTER SPA CONTROL SYSTEM (75) Inventors: Michael E. Tompkins, Missouri City, TX (US); Michael J. Green, Houston, TX (US)

(73) Assignees: Jacuzzi Inc., Chino, CA (US); Sundance Spas, Inc., Chino, CA (US)

Reexamination Request:
No. 90/012,205, Mar. 22, 2012

Reexamination Certificate for:
Patent No.: 5,550,753
Issued: Aug. 27, 1996
Appl. No.: 08/385,062
Filed: Feb. 7, 1995

Certificate of Correction issued Jul. 22, 1997

Related U.S. Application Data

(63) Continuation of application No. 08/162,420, filed on Dec. 3, 1993, now abandoned, which is a continuation of application No. 07/054,581, filed on May 27, 1987, now abandoned.

(51) Int. Cl.
*A61H 33/00* (2006.01)
*G05D 3/20* (2006.01)

(52) U.S. Cl.
USPC ............... 700/300; 236/12.12; 4/541.1

(58) Field of Classification Search
None
See application file for complete search history.

(56) References Cited

To view the complete listing of prior art documents cited during the proceeding for Reexamination Control Number 90/012,205, please refer to the USPTO's public Patent Application Information Retrieval (PAIR) system under the Display References tab.

*Primary Examiner* — Charles Craver (57) ABSTRACT

An improved spa control system is disclosed. The improvements may be made individually or in conjunction with any combination of all of the other improvements of the present invention. The invention describes a spa control system which calculates the rate of heating of the heater of the water in the spa to control the operation of the heating element. The system uses a interconnection panel to link a control panel to the power supply and to the operative components of the system. The unique connection of the control panel to the interconnection panel permits the control panel to be located adjacent to the spa.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-7 and 13 is confirmed.

Claims 8 and 10 are cancelled.

Claims 9, 11 and 12 were not reexamined.

* * * * *